Oct. 28, 1958 J. J. MARCH 2,857,648
METHOD OF MAKING A SEAMLESS CONDUIT
Filed June 13, 1957 2 Sheets-Sheet 1

INVENTOR.
JOHN J. MARCH
BY James H. Conner
AGENT.

Oct. 28, 1958 J. J. MARCH 2,857,648
METHOD OF MAKING A SEAMLESS CONDUIT
Filed June 13, 1957 2 Sheets-Sheet 2

INVENTOR.
JOHN J. MARCH
BY James H. Conner

AGENT.

United States Patent Office 2,857,648
Patented Oct. 28, 1958

2,857,648

METHOD OF MAKING A SEAMLESS CONDUIT

John J. March, Maspeth, N. Y.

Application June 13, 1957, Serial No. 665,528

8 Claims. (Cl. 25—154)

This invention relates generally to an underground hot water or steam distribution system and more particularly to a novel insulating structure for insulating the piping means in a hot water or steam distribution system. Heretofore, such distribution systems were formed from individual conduit sections having insulated pipe means or an alternate prior method employing the fabrication of a concrete slab and the monolithic formation of an insulating cement around the pipe means supported by said slab. These prior methods introduced several disadvantages among which was the waterproofing of the entire system. The built-up type waterproof arrangements of these prior systems necessitated joints which introduced the possibility of leaks and in insulation systems of this type, the entrance of water reduced the efficiency of the insulation and further permitted the creation of steam which is extremely undesirable. In addition, the surface of the insulation customarily was covered with a waterproof membrane which was subject to damage by backfill which introduced water leakage, etc. The present invention generally comprises a jointless built up structure which is unitarily formed of waterproof material having re-enforcing means to provide a relatively strong structure that cannot be broken accidentally under pressures which would rupture conventional distribution systems.

Accordingly, it is one of the principal objects of this invention to provide a seamless one piece conduit having re-enforcing means disposed therein.

Still another object of the invention is to provide a conduit of the class described that is substantially waterproof.

Still another object of the invention resides in the novel method of constructing the waterproof conduit.

Yet another object of the invention resides in the forming of a predetermined length of conduit without joints.

Other ancillary objects will be, in part, hereinafter pointed out and will be, in part, hereinafter apparent.

Figure 1:
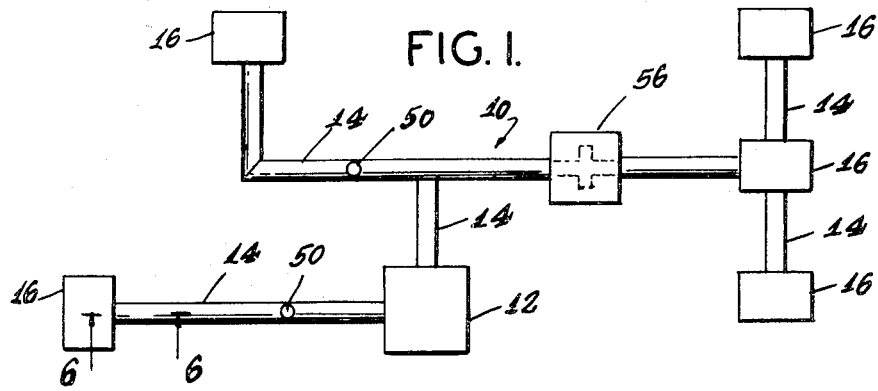
Figure 1 is a plan view of a typical high pressure steam or hot water distribution system.

Referring to the drawings in detail, 10 generally designates a high temperature hot water or steam distribution system consisting of a central heating plant represented at 12 in block diagram, Figure 1, piping 14 and remote utilizing stations 16. Piping 14 generally comprises a supply line 18 and a return line 20. Supply line 18 carries hot water or steam at temperatures ranging between 500 and 600 degrees and accordingly must be insulated to prevent temperature losses. The present invention relates to an improved method of insulating the piping and the insulating structure per se.

In distribution systems of the class described, it is conventional to initiate construction by digging a trench 22 between the plant 12 and the remote stations 16. The trench 22 is of sufficient depth to accommodate the piping structure 14 and after installation thereof is backfilled to further insulate and protect said piping.

In prior methods of construction preformed conduit sections were laid and the pipes 18—20 disposed therein. The conduit sections were either formed of tile, concrete or steel, however, all of the prior construction methods required many joints which introduced the possibility of leakage. Obviously, water leaking into the conduit would, in addition to damaging and reducing the effectiveness of the insulation, upon contacting the hot supply pipe 18 turn into steam producing a dangerous condition.

The present invention provides a built-up conduit that is seamless and, therefore, cannot leak at the nonexistent joints. Essentially, the invention comprises the method of fabricating the conduit and the novel construction of the conduit.

The piping 14 is formed by placing a pair of spaced wood members 24—26 longitudinally along the bottom of trench 22. A combination rubber and plastic membrane 28 is disposed between the spaced wood members 24 and 26 with the marginal edges thereof extending beyond said wood members. This membrane may be of the type that is manufactured by Rubber & Plastics Compound Co., Inc., Rockefeller Plaza, New York, New York, under the brand name of Nervastral. The membrane may be described as a non re-enforced, homogeneous, waterproof, impermeable material composed of elastomeric substances which have been reduced to a thermoplastic state and extruded into a continuous sheet. This sheet of predetermined width is laid in the trench in one continuous length between each station and intermediate expansion pipe joints.

Figure 2:
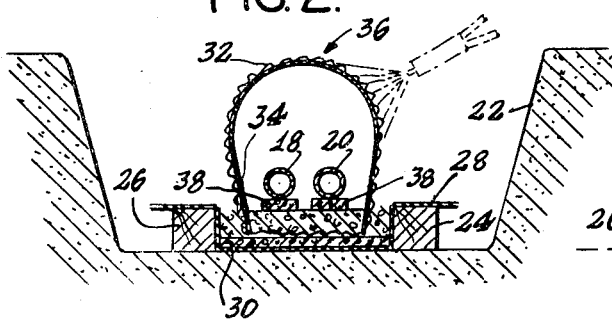
Figure 2 is a cross-sectional view of a trench wherein the conduit is being formed in accordance with the novel method of construction.
Figure 3:
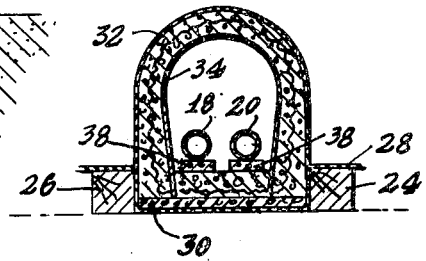
Figure 3 is a cross-sectional view of the built-up conduit.
Figure 4:
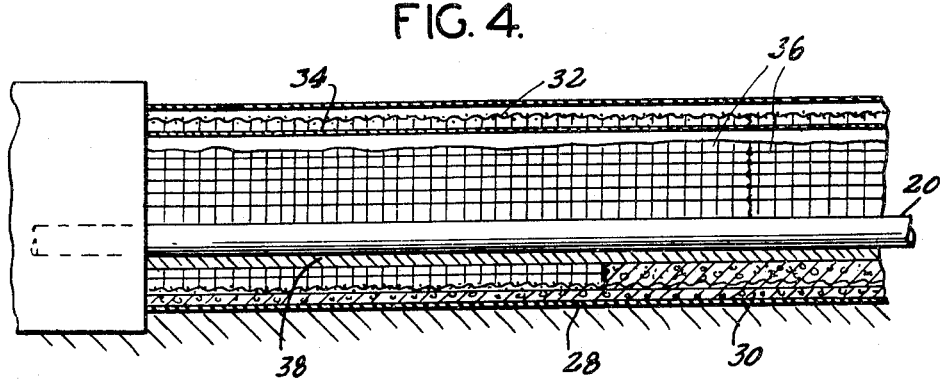
Figure 4 is a longitudinal section taken along line 4—4 of Figure 6 with the inner built-up of concrete cut-away to illustrate the disposition of the re-enforcing wire frame.
Figure 5:
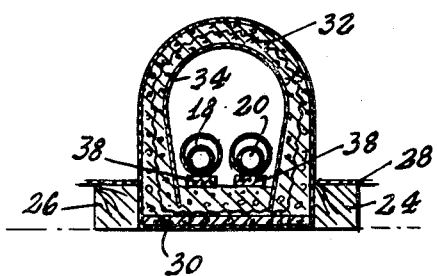
Figure 5 is a cross-sectional detail of the completed conduit showing fiberglass blankets disposed around the pipe.

As shown, in Figure 2, thin layer 30 of concrete is poured on membrane 28 to form a protective coat on said membrane. A re-enforcing wire mesh 32 such as that manufactured by Pittsburgh Steel Products Co., Pittsburgh, Pennsylvania, under the brand name Steeltex is formed as a tube having a predetermined diameter. The re-enforcing wire mesh 32 is provided with an interlaced waterproof paper backing 34. Each adjacent tube section is wire laced one to the other to provide a substantially continuous length of re-enforcing 36. The formed tube 36 is positioned on the concrete layer 30.

Prior to completing the closure of wire mesh 32, a mixture of cement, sand and water is sprayed under pressure of approximately seventy-two (72) pounds per square inch onto the layer 30. The ratio of cement to sand may vary from 1:1 to 1:3. The sprayed mixture is applied both internally on the lower portion of the mesh 32 and externally adjacent to the portion of the mesh that resides upon the concrete layer 30. Thus, the lower portion of the mesh 32 becomes substantially embedded in the built-up cement mixture. A plurality of support blocks designated as 38 are then disposed in aligned relation along the built-up portion internally of the mesh 32. The pipes 18 and 20 are disposed on the upper surfaces of the blocks 38. It will be noted that the pipes 18 and 20 may be tested at this point of construction and fiberglass blanketing wrapped therearound. The mesh 32 is then formed to join the tube structure 36. Pressured cement is then applied to the mesh 32 (externally) and built-up to the desired thickness. Upon application thereof, the paper backing 34 is designed to yield inwardly thereby permitting a build-up of cement that substantially encompasses the mesh 32 and in effect embeds the mesh therein.

It may be said that the piping conduit 10 is jointless or without seams between stations.

An outer layer of membrane 28 is applied to the exposed periphery of the conduit and the extending portions of the initially installed membrane are disposed in overlapping relation on the latter membrane. This is accomplished by means of a conventional binder.

Figure 6:
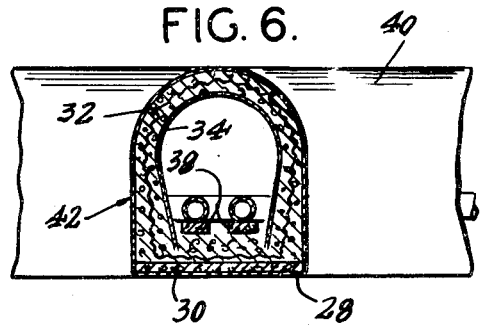
Figure 6 is a fragmentary view of a T-shaped conduit junction.
Figure 7:
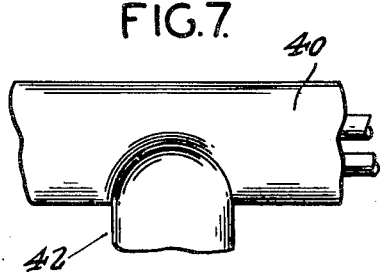
Figure 7 is a plan detail of the T-shaped junction.
Figure 8:
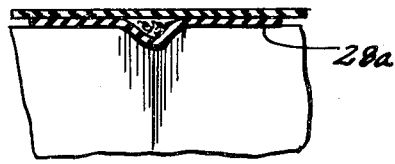
Figure 8 is an enlarged detail of an expansion joint.

In the modification shown in Figures 6 and 7, the mesh 32 is interlaced with wire to form a T structure. It is apparent that a portion of mesh is cut away from the main conduit 40 and the mesh 32 forming the secondary conduit 42 wired thereto. The cement spraying process is then applied to produce a unitary T section. In the T section, the membrane 28 is overlapped on a strip shown as 28a, Figure 8, and sealed with a binding agent analogous to that hereinbefore described.

Figure 9:
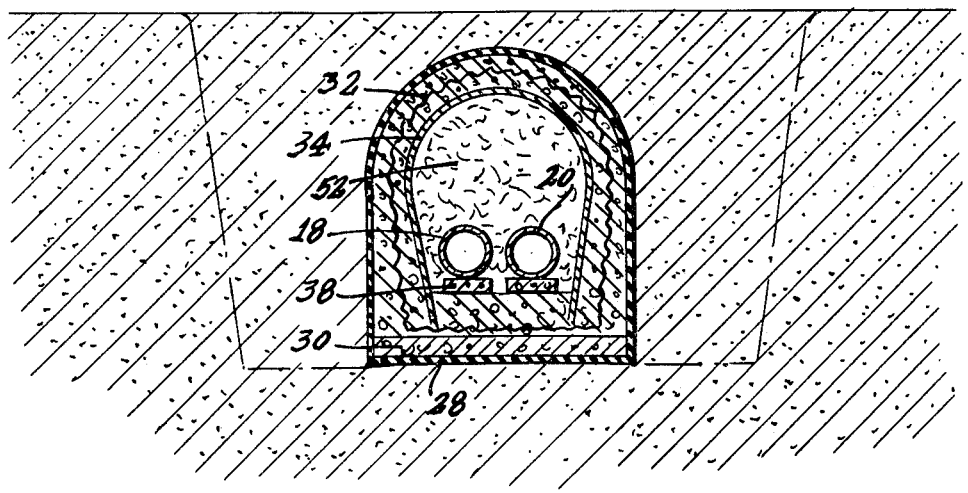
Figure 9 is a cross-sectional view of a completed installation with the trench backfilled.

Watertight manholes 50 of conventional structure may be disposed as desired in the conduit piping 14. These manholes provide access for inspection, etc., or may be utilized as entry ports for the introduction of fiberglass foam or pellets shown as 52 in Figure 9. The fiberglass foam or pellets 52 substantially surround pipes 18 and 20 to further the thermal insulation thereof.

It will be understood that expansion boxes, such as shown at 56 in Figure 1, may be provided. However, expansion boxes of this character are conventional and do not introduce joints or seams to the present novelly constructed conduit. When set forth as being substantially one piece and continuous, it is understood to be so constructed between stations, expansion boxes, etc.

Upon completion of the conduit system, the open trench may be backfilled with earth. Heretofore, conduit constructed by prior methods were susceptible to damage during backfilling operations due to their relatively low strength. The present invention has been subjected to pressures of approximately 7200 pounds per square inch without any material cracking or damage. Therefore, the possibility of accidental damage has been greatly reduced, if not eliminated.

Thus, it is apparent that there has been provided a device in which the several objects of the invention are achieved and which is well adapted to meet the conditions of practical use.

While there has been shown and described a single embodiment of the invention, it is to be understood that modifications and changes might be made without departing from the scope of the present invention except as limited by the claims.

The invention claimed is:

1. In an underground high temperature piping distribution system, the method of forming a seamless conduit, comprising the steps of forming a concrete base in a trench, positioning lengths of wire mesh formed with a paper backing on the concrete base, spraying the concrete base and wire mesh thereon with a wet mixture of cement and sand to build up the concrete base to substantially encompass the wire mesh thereon, forming the wire mesh in a substantially cylindrical relation, and spraying the wire mesh with a wet mixture of cement and sand to build up a cement body around the said wire mesh.

2. In an underground high temperature piping distribution system, the method of forming a seamless conduit, comprising the steps of forming a concrete base in a trench, positioning lengths of wire mesh formed with a paper backing on the concrete base, spraying the concrete base and wire mesh thereon with a wet mixture of cement and sand to build up the concrete base to substantially encompass the wire mesh, forming the wire mesh in a substantially cylindrical relation, and spraying the wire mesh with a wet mixture of cement and sand to build up a cement body around the said wire mesh, and applying a waterproof membrane around the periphery of said conduit.

3. In an underground high temperature piping distribution system, the method of forming a seamless conduit, comprising the steps of forming a concrete base in a trench, positioning lengths of wire mesh formed with a paper backing on the concrete base, spraying the concrete base and wire mesh thereon with a mixture of cement and sand at a pressure of approximately seventy pounds per square inch to build up the concrete base to substantially encompass the wire mesh, forming the wire mesh is a substantially cylindrical relation, and spraying the wire mesh with a similar mixture of cement and sand at a similar pressure to build up a cement body around said wire mesh.

4. The method of forming a jointless one piece underground conduit, comprising the steps of placing a waterproof membrane in the bottom of a trench, pouring a layer of concrete on said waterproof membrane, positioning a paper back wire mesh on said layer of concrete, spraying a wet mixture of cement and sand on said paper back mesh adjacent to the portions thereof residing on said layer of concrete to build up the concrete into a homogeneous mass of cement that substantially encompasses the wire mesh, forming the wire mesh in substantially cylindrical relation and spraying the outer periphery of the paper back mesh with a wet mixture of cement and sand to repetitively build up layers of cement and form a seamless hollow cement conduit wherein the wire mesh is embedded therein.

5. The method of forming a jointless one piece underground conduit, comprising the steps of placing a waterproof membrane in the bottom of a trench, pouring a layer of concrete on an intermediate portion of said waterproof membrane to form a concrete base and provide laterally extending uncovered portions of said membrane, positioning a paper back wire mesh on said concrete base, spraying a wet mixture of cement and sand on said paper back mesh adjacent to the portions therof residing on said concrete base to build up said concrete base into a homogeneous mass of cement that substantially encompasses the wire mesh, forming the wire mesh in substantially cylindrical relation and spraying the outer periphery of the paper back mesh with a wet mixture of cement and sand to repetitively build up layers of cement and form a seamless hollow cement conduit wherein the wire mesh is embedded therein, and placing a waterproof membrane over said built-up conduit and binding the laterally extending portions of the bottom membrane thereto.

6. The method of forming a jointless one piece underground conduit, comprising the steps of placing a base defining means in the bottom of a trench, pouring a layer of concrete on said base defining means to provide a concrete base, positioning a paper back wire mesh on said concrete base, spraying a wet mixture of cement and sand on said paper back mesh adjacent to the portions thereof residing on said concrete base to build up said concrete base into a homogeneous mass of cement that substantially encompasses the wire mesh, forming the wire mesh in substantially cylindrical relation and spraying the outer periphery of the paper back mesh with a wet mixture of cement and sand to repetitively build up layers of cement and form a seamless cement conduit wherein the wire mesh is embedded therein, positioning piping means therein, and filling the hollow conduit with thermal insulating material.

7. The method of forming a jointless one piece underground conduit, comprising the steps of placing a waterproof plastic membrane in the bottom of a trench, pouring a layer of concrete on an intermediate portion of said waterproof membrane to provide a concrete base with uncovered laterally extending portions of said membrane, positioning a paper back wire mesh on said concrete base, spraying a wet mixture of cement and sand on said paper back mesh at a pressure of approximately seventy pounds per square inch adjacent to the portions thereof residing on said concrete base to build up said concrete base into a homogeneous mass of cement that substantially encompasses the wire mesh, forming the wire mesh in substantially cylindrical relation and spraying the outer periphery of the paper back mesh with a similar wet mixture of cement and sand to repetitively build up layers of cement and form a seamless hollow cement conduit wherein the wire mesh is embedded therein, curing said built-up conduit, applying a waterproof plastic membrane on the outer periphery of said conduit and sealing the latter membrane to the laterally extending portions of the base membrane.

8. In an underground high temperature piping distribution system, the method of forming a seamless conduit, comprising the steps of positioning lengths of wire mesh formed with a yieldable backing on a concrete base, spraying the concrete base and wire mesh thereon with a wet mixture of cement and sand to build up the concrete base to substantially encompass the wire mesh thereon, forming the wire mesh into conduit enclosure defining relation, and spraying the wire mesh with a wet mixture of cement and sand to build up a cement body around the said wire mesh.

References Cited in the file of this patent

UNITED STATES PATENTS

| | | |
|---|---|---|
| 891,855 | Pearce | June 30, 1908 |
| 1,005,717 | Knox et al. | Oct. 10, 1911 |
| 1,861,436 | Collins | June 7, 1932 |
| 2,007,969 | Grodsky | July 16, 1935 |
| 2,483,050 | Hinckon | Sept. 27, 1949 |